United States Patent [19]
Pittman

[11] 3,818,248

[45] June 18, 1974

[54] SERIALLY CONNECTED SEMICONDUCTOR SWITCHING DEVICES SELECTIVELY CONNECTED FOR PREDETERMINED VOLTAGE BLOCKING AND RAPID SWITCHING

[75] Inventor: Paul F. Pittman, Pittsburgh, Pa.

[73] Assignee: Westinghouse Electric Corporation, Pittsburgh, Pa.

[22] Filed: Dec. 6, 1972

[21] Appl. No.: 312,439

Related U.S. Application Data

[62] Division of Ser. No. 146,234, May 24, 1971, Pat. No. 3,731,185.

[52] U.S. Cl.................. 307/258, 307/305, 307/324, 324/54
[51] Int. Cl...................... H03k 17/04, H03k 17/10
[58] Field of Search........ 307/252 R, 252 A, 252 L, 307/223 B, 224 B, 225 B, 258, 305, 318, 320, 322, 324; 324/51, 52, 54, 55

[56] References Cited
UNITED STATES PATENTS

| | | | |
|---|---|---|---|
| 2,951,124 | 8/1960 | Hussey et al.................... | 307/258 X |
| 3,166,680 | 1/1965 | Kevane et al...................... | 307/258 |
| 3,325,723 | 6/1967 | Grayson................................ | 323/8 |
| 3,399,342 | 8/1968 | Fligel.................................... | 324/54 |
| 3,546,581 | 12/1970 | Herrendeen et al................. | 324/54 |
| 3,584,270 | 6/1971 | Philips............................ | 307/324 X |

Primary Examiner—Rudolph V. Rolinec
Assistant Examiner—L. N. Anagnos
Attorney, Agent, or Firm—G. H. Telfer

[57] ABSTRACT

An improved high frequency voltage test apparatus for insulated conductors is provided with a switching arrangement, preferably utilizing solid state switching devices, particularly reverse switching rectifiers, with means to minimize the turn on time of the switching devices and thus increase their life and reliability and also permit operation of the apparatus over a wide voltage range.

4 Claims, 5 Drawing Figures

SERIALLY CONNECTED SEMICONDUCTOR SWITCHING DEVICES SELECTIVELY CONNECTED FOR PREDETERMINED VOLTAGE BLOCKING AND RAPID SWITCHING

REFERENCE TO RELATED APPLICATION

This application is a division of Ser. No. 146,234, filed May 24, 1971, now U.S. Pat. No. 3,731,185.

BACKGROUND OF THE INVENTION

1. Field of the Invention

The invention relates to apparatus to test the quality of insulation on conductors in which the insulated conductor is subjected to a high frequency voltage. The present divisional application is particularly directed to semiconductor switching device arrangements useful in such insulation test apparatus and in other applications.

2. Description of the Prior Art

In the manufacture of electrical apparatus, such as dynamoelectric machines, optimum use must be made of all necessary materials. Such apparatus requires multiturn coils with adequate insulation to withstand the turn to turn voltage and to provide adequate mechanical support. If excessive coil insulation is used, the cost of the machine increases, while too little insulation may result in coil failure due to voltage breakdown. It has been a long established practice to subject coils after their formation to a screening test to insure insulation integrity.

Two methods of screening are in common use to test turn to turn insulation. One, sometimes known as the Rylander high frequency test, subjects the coil under test to a high frequency voltage. Background information on the Rylander test may be found in an article by J. L. Rylander, Transactions of the AIEE, Feb. 1926, pp. 459–65.

Another type of test, sometimes called a surge comparison test, induces a surge voltage in the coil under test resulting in dielectric stress in the insulation. Surge comparison testers are limited in voltage to levels below those of wide spread interest, particularly for large dynamoelectric machines. However, for general information on surge comparison testers, reference may be made to an article by G. L. Moses and E. F. Harter in Transactions of the IEEE, Vol. 64, July 1945, pp. 499–503.

These well known types of tests are based upon the relationship between coil voltage and current $E = 2\pi f L I$ where $E$ = coil voltage
$f$ = frequency
$I$ = coil current
$L$ = coil inductance.

If inductance, current, or excitation frequency increases, the voltage across the coil increases also. Coil inductance depends upon geometry and has a constant value while coil current is limited due to thermal considerations. Therefore, the high voltage needed to stress coil insulation must be obtained by exciting the coil at a high frequency, hence the name high frequency testing.

The basic type of Rylander tester, as it has been in use for many years, produces a damped high frequency voltage oscillation by discharging a capacitor into the coil under test. A rotating spark gap has been generally used to initiate the discharge. Coil insulation integrity is determined by sensing the resonant frequency of the discharge transient. The approximate dependence of discharge frequency on the values of discharge capacitance and coil inductance, where circuit resistance is negligible, is shown in the following equation:

$f = (1/2\pi)(1/LC)$ where $C$ = discharge capacitance.

A coil with either faulty insulation or an improper number of turns exhibits an apparent inductance and discharge frequency which differs from the norms and, by observation of the discharge frequency, faulty coils can be detected and screened.

The basic Rylander circuit can be generally illustrated by the circuit of FIG. 1. Capacitor 10 is used to store energy supplied to it by a charging circuit 12. At the appropriate time, switch 14, (e.g., a spark gap) is triggered and caused to close thereby initiating a highly oscillatory discharge of the energy stored in capacitor 10 into the coil under test 16. The approximate resonant frequency of the discharge is given by the equation above. The discharge current continues to oscillate until essentially all of the energy initially stored in capacitor 10 has been dissipated in heating losses in the discharge curcuit.

The Rylander high frequency rester, as it has been generally used, suffers from the disadvantage that the spark gap to initiate discharge is noisy both aubibly and electrically and, owing to its sensitivity to ambient conditions such as dirt and moisture, may be unreliable. In addition, the output of the wave meter used to indicate a coil fault is subject to variation with coupling to the test coil. As a result, testing in this manner may be difficult, time consuming, and highly subject to operator's skill. Also the apparatus lacks suitable portability.

An apparent direction to take in order to avoid the problems of the spark gap is the utilization of a solid state switch. Solid state switches, such as thyristors and four layer diodes, are recognized for their advantages in reliability and low noise. In modifying the Rylander test apparatus to employ solid state switches, it is necessary to use a series connection of a plurality of switching devices of which less than all may be connected to a test circuit depending upon the applied voltage.

Most solid state or semiconductor switches that may be generally characterized as the class of four layer switching devices, where four semiconductor regions of alternate conductivity, such as PNPN, comprise the basic structure, are capable of conducting large currents. Because of a time delay inherent in the establishment of the conditions for a low device voltage flowing a large current, they are not equally suitable for use in a circuit where large current must be turned on in a very short time as is required in test apparatus of the type of interest here. When a conventional thyristor is used for high current switching, the large initial value of di/dt, the rate or increase of current with time, associated with the start of the high frequency current pulse can cause the device to burn out owing to excessive localized heating.

P. Mylnar and J. E. Macko, in an unpublished communication known to the present inventor, have described apparatus using a type of four layer switching device called a reverse switching rectifier in the test apparatus. In the form as described by Mylnar and Macko, such a test circuit would have the general appearance of that of FIG. 2 which is substantially like that of FIG. 1 with the replacement of the spark gap 14 by a series connection 24 of reverse switching rectifiers 25 with means 26 to apply a trigger pulse to the series string.

The reverse switching rectifier (RSR) is a known type of device, a special form of four layer switching device, which has the general voltage-current characteristic as illustrated in FIG. 3. A positive voltage impressed across the device results in the flow of only a very small leakage current until a threshold voltage $V_{RS}$ is reached. Voltage in excess of the threshold value causes the device to break over into a low impedance state wherein a large current may flow while the device exhibits only a very small conducting voltage drop. This mode of operation is sustained by a combined action of two injecting PN junctions within the PNPN structure, and continues until the device current is reduced to zero by external means. If a voltage of opposite polarity is impressed upon the device, a large current flows with a very low conducting voltage drop. For description of an example of such a device and its manner of fabrication reference may be made to copending application Ser. No. 712,842, filed Mar. 13, 1968, now U.S. Pat. No. 3,584,279, issued June 8, 1971 by J. Philips and assigned to the assignee of the present invention.

For a test apparatus to be generally useful in testing the various type of coils used in a variety of large dynamoelectric machines, the circuit must be capable of operation with capacitor charge voltages ranging from 750 volts to 26,000 volts. To operate at 26,000 volts, a series string 24 in the circuit of FIG. 2 may have about 30 or more typical reverse switching rectifiers but the number must be reduced proportionately for lower voltage operation. In the apparatus of Mylnar and Macko, a 10 position switch was installed to achieve this reduction in the number of connected reverse switching rectifiers (from a total of 32 in that apparatus), by permitting variation of the locations of the points B and C shown in FIG. 2 to various positions along the series string, while mechanical linkage between the switch and the charging circuit permitted mechanically restricting the motion of a variable transformer which set the AC voltage applied to the primary of a charging transformer. By so doing the capacitor charge voltage and number of RSR's connected in the circuit are matched in 10 increments ranging from three RSR's at 750 volts and 32 RSR's at 26,000 volts.

The circuit of Mylnar and Macko operates generally satisfactorily except for the occurrence of excessively long turn on times exhibited by the RSR's. Turn on times of the order of 1 microsecond were observed for devices operating in this circuit, in contrast to values of about 0.07 to 0.1 microsecond for which the RSR is known to be capable. The large values of turn on time result in excessive device heating, much of which is localized, and leads to reduced life and ultimate failure.

The present invention came about through an interest in overcoming the problems of the prior art as discussed above.

SUMMARY

Briefly, the improvement of the present invention is in the manner in which a selected number of a plurality of switching devices in a series string are interconnected with test apparatus intended to function at various voltage levels. The invention is particularly suitable for application to apparatus as basically described by Rylander and modified by Mylnar and Macko, although in its broadest aspects the present invention is not necessarily limited thereto.

The invention provides a switching arrangement which leaves in the serial connection a number of "unused" devices at a floating potential, except at the highest voltage for contemplated use, which act to provide a distributed capacitance in the circuit which facilitates the turn on of the series string of devices connected across the test circuit without requiring discrete capacitance across each of the elements.

Results to date with RSR's in circuits for operation to 750 to 26,000 volts show consistently good turn on times of the order of 0.1 microsecond.

DRAWING

PREFERRED EMBODIMENTS

Figure 4:
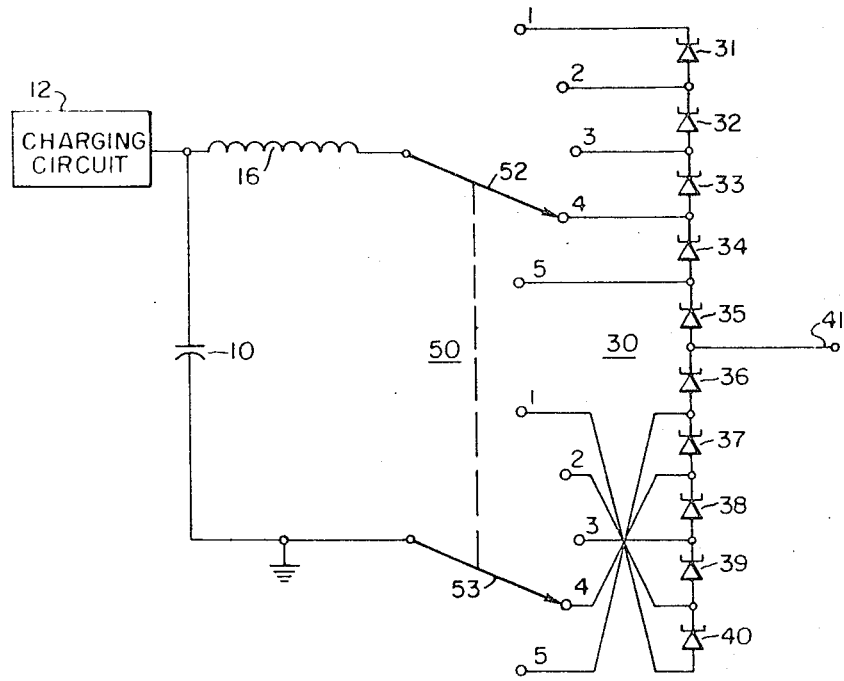
FIG. 4 is a schematic diagram of a circuit in accordance with one embodiment of the present invention.

FIG. 4 illustrates an embodiment of the present invention wherein a capacitor 10 and an insulated conductor or coil 16 under test are in a circuit in the basic Rylander arrangement. The capacitor 10 is charged by a charging circuit 12 which can apply a voltage at various levels, which in the range of principal interest in the practice of this invention extends to above 10,000 volts and over a range of at least an order of magnitude. The circuit is provided with a switching means 30 to effect discharge of the capacitor 10 to provide a high frequency voltage into the coil under test and produce an oscillatory waveform that can be measured or examined by means not described herein but which may include oscilloscope tracings produced in a manner such as that described in copending application Ser. No. 146,233, filed May 24, 1971, by the present inventor and assigned to the present assignee.

The switching means 30 comprises a plurality of serially connected switching devices 31–40 (including 10 devices in this example) that are associated with the test circuit, including the capacitor 10 and the insulated coil 16, by a means 50 for selectively connecting a number of the plurality of switching devices 30 (from two to 10 in this example) to the test circuit. The means 50 operates in a manner such that those switching devices that are unconnected to the test circuit remain in the series connection of switching devices and include at least one at the end of the series connection on the high voltage side of the capacitor, at a floating potential, to contribute a distributed capacitance to the circuit.

In accordance with the preferred embodiment, the switching devices are solid state switches of the four layer type and more particularly those termed reverse switching rectifiers as have been previously described. A trigger pulse is applied on line 41 to a point in the series string of switching devices. Although this example shown only 10 reverse switching rectifiers in the series connection, it is contemplated that typical reverse switching rectifiers would be required in a number of about 30 or more to encompass the voltage range of interest for application of the insulation test apparatus.

The means 50 for selectively connecting a desired number of the switching devices into the test circuit comprises, in this example, a double pole, multi-throw switch with fixed connections from each of the wiper arms 52 and 53 of the switch means 50 to the high voltage side of the circuit and the ground side of the circuit respectively. The other ends of the arms 52 and 53 are selectively connectable with the RSR's in between each of which are contact elements of two groups of five contact elements (numbered in this example from 1 to 5 in each group) to illustrate that with the switch in position number 1, 10 RSR's are connected into the test circuit, while in position number 5 only devices 35 and 36 are connected. In the intermediate positions, 2 and 3 and 4, successive pairs of devices are dropped from the connection to the test circuit. However, in no case is the connection between the switching devices opened, that is, the series connection 30 remains intact regardless of the number or RSR's connected into the test circuit. Consequently, in all switch positions except number 1, some devices at the end of the series string adjacent the high voltage side of the charged capacitor are floating at the high direct potential of the capacitor prior to switching and contribute to distributed capacitance. The advantages and effect of this distributed capacitance will be explained hereinafter.

It is to be noted in the preferred embodiment, the means 50 for selectively connecting the switching devices is such that those devices remaining unconnected to the test circuit are in two groups of equal numbers at the ends of the series connection so that as the switch position changes to reduce the number of switching devices to take into account reduced test voltage there is a gradual increase in the number of devices at the high end of the series connection. The number of devices at the ground or low voltage end is of little consequence but the symmetry provided in the switching arrangement as shown wherein a pair of elements, one from the top of the string and one from the bottom of the string are dropped on each change in switch position is a convenient one for effecting the purposes of the invention and facilitates the application of suitable triggering pulses to line 41.

For a further understanding of the present invention the following explanation is presented.

It has been found that the turn on time of four layer switching devices such as RSR's is affected by the amount of current available to flow through the device as it breaks down. That is, as turn on current increases, turn on time decreases. The very short turn on time of about 0.1 microsecond, which approaches the limiting value for the reverse switching rectifier, is realized only if a turn on current of approximately 10 amperes or greater can flow during turn on.

Figure 1:
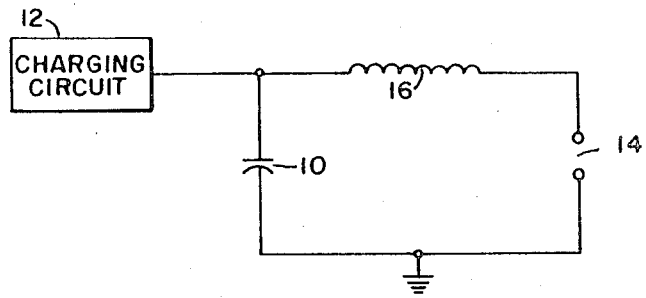
FIG. 1 is a general circuit schematic illustrating the type of prior art circuit to which the present invention relates, as has been previously discussed herein.
Figure 2:
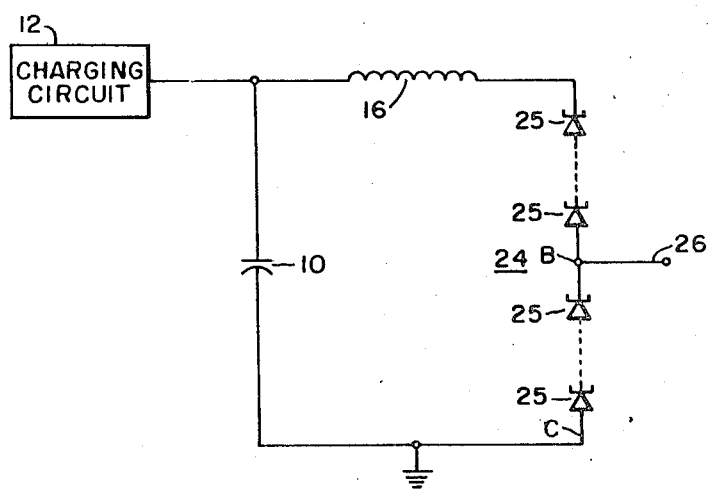
FIG. 2 is a schematic diagram of an additional form of prior art circuit described hereinbefore.
Figure 3:
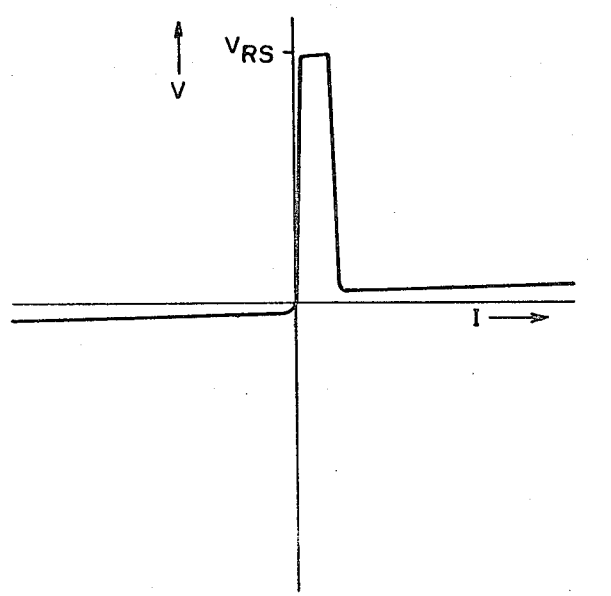
FIG. 3 is a voltage-current characteristic curve for a reverse switching rectifier which is a known semiconductor device as has been discussed above and is used in the circuit of FIG. 2.

In the circuit of the prior art illustrated in FIG. 2, the current which flows through the RSR's is limited by the inductance of the coil under test. A calculation can be made of the value to which the current builds up in 0.1 microsecond in that circuit, which would desirably be the time required for the RSR's to turn on. The voltage across the RSR string is assumed to decrease linear during this interval.

Because RSR turn on time is short compared with the period of oscillation of the LC circuit, the capacitor will not discharge very much during this interval. The current flowing through the RSR's at the end of the turn on interval is approximately $$I_1 = \frac{1}{L_T} \int_0^{T_1} v_L(t) \, dt$$

where
$I_1$ = RSR current at the end of the turn on interval
$L_T$ = test coil inductance
$v_L$ = voltage across test coil during RSR turn on
$T_1$ = length of turn on interval.
Then
$V_L(t) = V_{co}(t/T_1)$
where
$V_{co}$ = capacitor charge voltage just prior to RSR triggering.
Then
$I_1 = (V_{co} T_1)/2L_T$.

The apparatus in question is intended to operate over an approximate range of inductances for coils of about 16 microhenries to 200 microhenries. Measurements made on the system indicate that the internal wiring adds approximately 20 microhenries to the inductance of the discharge circuit. Based on these numbers, the RSR's current flowing at the end of an interval of 0.1 microsecond can be found to be, from the above equation, of the following values for the capacitor voltages of interest and the coil inductances of interest.

| Capacitor Voltage | RSR current at Different Coil Inductance | |
|---|---|---|
| | 16 μ H. | 200 μ H. |
| 750 v. | 1 A. | 0.17 A. |
| 26,000 v. | 36 A. | 6 A |

As illustrated in the table, the required current for fast turn on is available for only part of the range of capacitor voltages and coil inductances that are of interest.

It has been known that the turn on time of four layer switching devices can be reduced by adding capacitance across the RSR stack such as by using fixed discrete capacitors connected across the stack. This however, entails additional components and cost and is undesirable.

In the present invention, the variation of capacitance resulting from variation of the switch position associating the RSR string to the test circuit is sufficient to provide minimal turn on time. In order to illustrate the variation of capacitance with switch position, let $n$ be the number of untriggered RSR's connected in the circuit where n is at least one and no more than five. Let C1 be the amount of distributed capacitance to ground contributed by one unconnected device. The total equivalent distributed capacitance ($C_{eq}$) is then $$C_{eq} = (5-n) C_1.$$

Switching the ground point of the circuit has little effect on the distributed capacitance.

Figure 5:
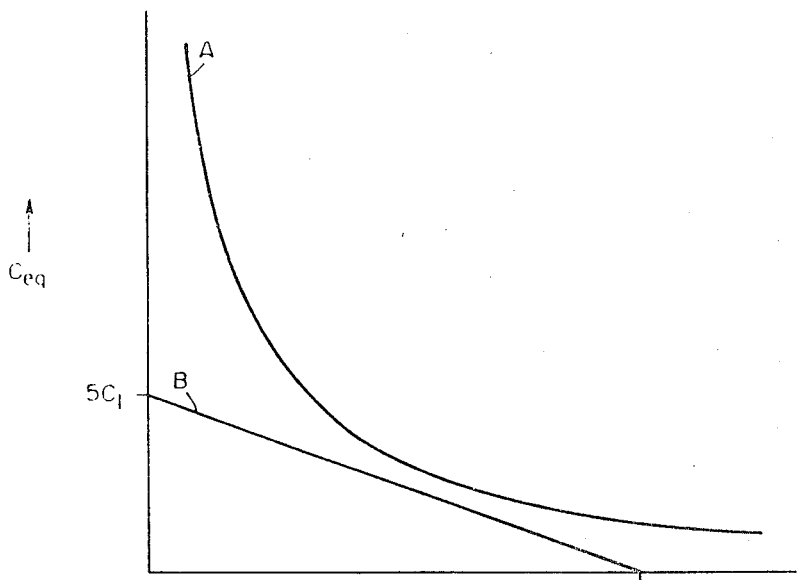
FIG. 5 is a graph of data helpful to an understanding of the present invention.

Consider now the equivalent capacitance of the series string of RSR's with a discrete capacitor connected across each device. This configuration is known to yield short turn on time. The equivalent total capacitance to ground of such a series string is $$C_{eq} = C_2/n$$

where $C_2$ is a capacitance of one of the discrete capacitors and $n$ is the number of devices in series. The mathematical form of both equations for equivalent capacitance given above is shown in the graph of FIG. 5 where the capacitance is plotted as a relation to the number of operating devices. Curve A is for the case resulting from the practice of the prior art circuit in which a discrete capacitor is connected across each operative device. Curve B is for the case in which no discrete capacitors are connected but the distributed capacitance introduced by the floating switching devices at the high voltage end of the string is totalled. It can be seen that over a limited range for a small number of operating devices such as would be encountered at the low voltage end of the operating range the nature of the relationships is similar.

Photographs of traces of RSR turn on time when taken with both the original switching connection as exemplified by FIG. 2, without additional capacitances, and with the circuit of the invention as exemplified by FIG. 4, the switching time for the old arrangement would be of the order of 1 microsecond while for the improved circuit they were about 0.1 microsecond for all switch positions measured.

Because of the high voltages involved, a radio frequency type of switch is preferred for use as means 50 in actual embodiments of the invention. Such a switch, known to the art, is of the type characterized by a lack of sharp points, the use of corona rings, large conductor separation distances, and the use of high quality ceramic insulators as conductor supports.

The switch is used in a dual mode. In one aspect, it is used to select the proper number of RSR devices required to block the capacitor charge voltage at any required test level, thereby also acting as a coarse voltage range selector. In a second function, the switch connects the trigger pulse into the proper point in the series connected RSR string to turn on the solid state switches within the specified test voltage level. In addition, this same high voltage radio frequency type switch is mechanically coupled to the variable autotransformer at the primary circuit of the high voltage potential transformer in the DC supply. As the switch is rotated from one test voltage range to another, the variable autotransformer is physically positioned in 30° increments throughout its range to reflect a 2.5 kv DC peak change in the secondary output voltage for each range. Owing to the movement limiting action of a mechanical interlock, the variable autotransformer is also used as the fine, or vernier, voltage control in each test voltage range, thereby protecting the devices in the solid state switch by preventing them from being triggered with either too low or too high an open circuit voltage.

It can be seen that in its broader aspect, the present invention relates to means to minimize the turn on time of a plurality of serially connected solid state switching devices of the four layer type without requiring additional components such as discrete capacitors connected thereacross, regardless of the nature or application of the circuit in which such series string is connected except that there be a variable voltage at one end of the series string.

I claim:

1. Electronic apparatus comprising: a plurality of serially connected semiconductor switching devices; means for selectively connecting a first number of said plurality of switching devices to an operating circuit to provide in said first number sufficient devices to block a predetermined voltage in said operating circuit with said first number decreasing with decreasing voltage to leave a second number of said devices in said series connection at a floating potential and providing a distributed capacitance to ground that minimizes the turn on time of said first number of devices.

2. The subject matter of claim 1 wherein: said voltage varies over a range of at least an order of magnitude; said switching devices are of the four layer type; said means for selectively connecting is such that said second number of said swtiching devices is in two groups of approximately equal size at the ends of the series connection.

3. The subject matter of claim 1 wherein: said means for selectively connecting comprises a double pole, multi-throw switch with first and second movable arms each having an end connected with a high voltage side of said operating circuit and with a ground point, respectively, and the free ends of said movable arms are jointly movable over respective pluralities of contact elements individually located at ends of said plurality of serially connected semiconductor switching devices and at points between adjacent ones of said plurality of serially connected semiconductor switching devices.

4. The subject matter of claim 1 wherein: said switching devices are reverse switching rectifiers.

* * * * *